United States Patent [19]
Rapp et al.

[11] Patent Number: 5,968,648
[45] Date of Patent: *Oct. 19, 1999

[54] FIBERS HAVING PHOSPHORUS-CONTAINING COATINGS

[75] Inventors: Charles Frederick Rapp; Carl Richard Strauss; Neil McIver Cameron, all of Granville, Ohio

[73] Assignee: Owens Corning Fiberglas Technology, Inc., Summit, Ill.

[*] Notice: This patent is subject to a terminal disclaimer.

[21] Appl. No.: 08/851,911

[22] PCT Filed: Dec. 4, 1996

[86] PCT No.: PCT/US96/19326

§ 371 Date: May 6, 1997

§ 102(e) Date: May 6, 1997

[87] PCT Pub. No.: WO97/20782

PCT Pub. Date: Jun. 12, 1997

Related U.S. Application Data

[63] Continuation-in-part of application No. 08/566,530, Dec. 4, 1995, Pat. No. 5,658,836.

[51] Int. Cl.$^6$ ..................................................... B32B 19/00
[52] U.S. Cl. ..................... 428/357; 428/378; 428/389; 428/392; 501/36; 501/69; 501/70; 427/215; 252/62; 162/145; 162/152; 162/156; 106/18.14

[58] Field of Search ...................................... 428/378, 389, 428/392, 357; 501/36, 70, 69; 106/18.14; 162/152, 156, 145; 427/215; 252/62

[56] References Cited

U.S. PATENT DOCUMENTS

| 4,194,914 | 3/1980 | Moriya et al. | 16/18.14 |
| 4,366,251 | 12/1982 | Rapp | 501/36 |
| 4,381,347 | 4/1983 | Carbol | 501/36 |
| 4,560,606 | 12/1985 | Rapp et al. | 428/141 |
| 5,250,488 | 10/1993 | Thelohan et al. | 501/36 |
| 5,312,806 | 5/1994 | Mogensen | 501/36 |
| 5,332,699 | 7/1994 | Olds et al. | 501/36 |
| 5,658,836 | 8/1997 | Rapp et al. | 501/36 |

*Primary Examiner*—Deborah Jones
*Assistant Examiner*—Abraham Bahta
*Attorney, Agent, or Firm*—Stephen W. Barns

[57] ABSTRACT

Mineral fibers are provided with a phosphorus-containing coating to impart high-temperature resistance without substantially affecting mechanical performance. Preferred mineral-fiber compositions according to the invention with relatively high levels of $SiO_2$ and low levels of $Al_2O_3$ and $Fe_2O_3$ compositions may advantageously be used for insulation. Such compositions have high-temperature resistance and high biosolubility, yet have properties which allow current processes to fabricate them into insulation. Preferably, the mineral fibers have a KI value $\geq 40$.

29 Claims, No Drawings

FIBERS HAVING PHOSPHORUS-CONTAINING COATINGS

CROSS-REFERENCE TO RELATED APPLICATION

This is a continuation-in-part of U.S. patent application Ser. No. 08/566,530, filed Dec. 4, 1995 now U.S. Pat. No. 5,658,836.

TECHNICAL FIELD AND INDUSTRIAL APPLICABILITY OF THE INVENTION

This invention relates to mineral fibers and their compositions. This invention further relates to phosphate-coated fibers. This invention also relates to high-temperature resistant mineral fibers which have high biosolubility.

BACKGROUND OF THE INVENTION

Mineral-fiber insulation is well known and has been a commercial product for a long period of time. The insulation is made from rock or slag fibers often referred to as mineral wool or rockwool. Fibrous mineral-wool insulation products generally comprise fibers bonded together by a cured thermoset polymeric binder to impart rigidity and improved mechanical performance to the insulation.

Mineral fibers have not been linked to disease in man. On the other hand, research has established that asbestos fibers when inhaled can cause significant disease in man. Though the exact mechanisms responsible for the biological activity of inhaled asbestos fibers is unknown, it is widely believed that their ability to remain in the lung for extended periods of time is an important factor. The durability or residence time in the lung of mineral fibers, however, appears to be much less than that of asbestos fibers.

Nonetheless, as an added precaution the German government has proposed regulations for mineral fibers. The proposed German regulations indicate that mineral wools should contain very high amounts of alkali and alkaline earth oxides to give the fibers a very high biosolubility. In particular, the proposed regulations set forth, as a criterion for sufficient biosolubility, a KI index where the sum of $CaO+MgO+Na_2O+K_2O+BaO+B_2O_3$ minus two times the $Al_2O_3$ must be at least 40 weight percent (i.e., $KI=\Sigma(CaO+MgO+Na_2O+K_2O+BaO+B_2O_3)-2Al_2O_3 \geq 40$). Mineral-fiber compositions meeting this criterion are considered to be free of suspicion.

An undesirable feature of highly soluble mineral-wool compositions having a KI value of at least 40, however, has been that they have low viscosities at the forming temperature. Thus, a problem for the manufacturer is to produce fibers which meet the index and other desired criteria: fibers should meet the KI index, be fiberizable in standard rockwool processes, have sufficient durability, and have acceptable insulating properties. Another problem has been to achieve mineral fibers having a KI value of at least 40 and high-temperature resistance.

An important use of mineral-fiber insulation is as a fire barrier in buildings. To perform properly in this application, the mineral fiber must have high-temperature resistance. Most mineral wools with high-temperature resistance contain high amounts of iron oxides (4 to 12 weight percent). The iron oxide acts as a nucleating agent so that the fiber will crystallize rather than melt during a fire. This high amount of iron oxide also reduces the high-temperature viscosity of the melt and can make fiber forming difficult. This is particularly true for compositions formulated with very high amounts of CaO+MgO to give a high biosolubility.

SUMMARY OF THE INVENTION

We have developed compositions which meet the proposed German criterion for high biosolubility. Although the forming properties of some compositions are somewhat inferior to the standard rockwool, they can be formed by standard mineral-wool forming processes. However, the fibers do not have good high-temperature performance.

We have found that mineral fibers, including those with KI values of 40 or more, often melt when exposed to high temperatures such as those encountered in a fire. For example, after heating fibers blown from each of the following white-wool compositions A–D from room temperature to 1700° F. (927° C.) according to the ASTM E119, the fibers melted to form a consolidated mass:

| Ingredient | Amount (weight percent) | | | |
|---|---|---|---|---|
| | Comp. A | Comp. B | Comp. C | Comp. D |
| $SiO_2$ | 44.82 | 39.67 | 40.89 | 51.35 |
| $Al_2O_3$ | 8.96 | 9.99 | 7.23 | 2.50 |
| MgO | 10.90 | 13.31 | 13.72 | 11.90 |
| CaO | 33.49 | 37.03 | 38.17 | 33.10 |
| $Na_2O$ | 0.04 | — | — | 0.50 |
| $K_2O$ | 0.65 | — | — | 0.20 |
| $Fe_2O_3$ | 0.09 | — | — | 0.30 |
| $TiO_2$ | 0.49 | — | — | 0.15 |
| MnO | 0.56 | — | — | — |
| $P_2O_5$ | 0.02 | — | — | — |

(The mean fiber diameters, in $\mu m$, for the fibers of compositions A, B, and C were 2.75, 2.11, and 2.13, respectively. As indicated, total iron is calculated in the above table as $Fe_2O_3$, which may be converted to an FeO basis by dividing by 1.1113.) An object of the invention is therefore to provide mineral fibers having high-temperature or fire resistance. A further object is to provide fibers with improved high-temperature performance without significant loss in mechanical performance. Another object of the invention is to develop fire-resistant fibers that also have high biosolubility.

We have found that the addition of high amounts of iron oxide improve the high-temperature or fire performance of fibers. The iron is substituted for an amount of $SiO_2$ to keep the solubility index at 40 weight percent. However, high amounts of iron further decrease the high-temperature viscosity and degrade the fiber-forming properties of the melt. Accordingly, an additional object of the invention is to achieve fire-resistant fibers that have desirable high-temperature viscosities and fiber-forming properties.

These and other objects have been achieved by phosphate- or phosphorus-coated fibers of the invention. The fibers have a composition as follows (in accordance with standard practice, certain ingredients or components are reported as oxides, with the amounts representing the approximate average values by sample analyses based on the weight of the composition): 37 to 64 weight percent $SiO_2$, 0 to 12 weight percent $Al_2O_3$, 30 to 51 weight percent $CaO+MgO$, and 0 to 6 weight percent $Na_2O+K_2O$. Optionally, additional components, such as up to 7.0 weight percent total iron (present as $Fe^{2+}$ or $Fe^{3+}$) expressed as FeO, and up to 1.5 weight percent total sulfur expressed as $S^{2-}$, may be included in the composition. Preferably, the coating composition contains at least one phosphorus-containing additive selected from: aluminum phosphate; diammonium hydrogen phosphate (DAP); monoammonium dihydrogen phosphate (MAP); phosphoric acid; sodium pyrophosphate (SPyP, which may be supplied in an anhydrous or hydrated form); and calcium phosphate, dibasic. The coating composition may also contain other additives, such as a binder (e.g., a phenolic binder) or colloidal silica. The coating composition preferably contains a total amount of phosphate, calculated as $P_2O_5$, of from 0.5 to 10.0, more preferably 1 to 5, percent by weight based on the total weight of the fiber and coating.

In a preferred embodiment, the coated fibers have a KI value of at least 40. In another preferred embodiment, the invention involves mineral wools and mineral-wool products having a low iron content and a high-temperature resistance obtained through the use of the coating, such as one containing ammonium phosphate, on the fiber surface. Optionally, bulk nucleating agents, such as FeS, may be used to further enhance properties. By the invention, a mineral wool or mineral-wool product with a high biosolubility and high-temperature resistance may be produced.

DETAILED DESCRIPTION AND PREFERRED EMBODIMENTS OF THE INVENTION

We have found that the phosphate- or phosphorus-containing coatings of the invention enhance the high-temperature or fire resistance of mineral fibers.

The fiber compositions of the invention each contains the following amounts of components: 37 to 64 weight percent $SiO_2$, 0 to 12 weight percent $Al_2O_3$, 30 to 51 weight percent CaO+MgO, 0 to 6 weight percent Na2O+$K_2O$, 0 to 7 weight percent total iron (present as $Fe^{2+}$ or $Fe^{3+}$) expressed as FeO, and 0 to 1.5 weight percent total sulfur expressed as $S^{2-}$ (unless indicated otherwise, all percentages herein are by weight). Preferably, the combined amount of silica ($SiO_2$) and alumina ($Al_2O_3$) is at least 44 weight percent.

Preferred fiber compositions are as follows: 44 to 62 weight percent $SiO_2$, 0 to 8 weight percent $Al_2O_3$, 33 to 50 weight percent CaO+MgO, 0 to 5 weight percent $Na_2O$+$K_2O$, 0 to 6 weight percent total iron (present as $Fe^{2+}$ or $Fe^{3+}$) expressed as FeO, and 0 to 1.2 weight percent total sulfur expressed as $S^{2-}$. Preferably, the combined amount of silica plus alumina is at least 48 weight percent.

More preferred fiber compositions are as follows: 47 to 59.5 weight percent $SiO_2$, 0 to 4 weight percent $Al_2O_3$, 36 to 48 weight percent CaO+MgO, 0 to 5 weight percent $Na_2O$+$K_2O$, 0 to 4 weight percent total iron (present as $Fe^{2+}$ or $Fe^{3+}$) expressed as FeO, and 0 to 1 weight percent total sulfur expressed as $S^{2-}$. Preferably, the combined amount of silica and alumina is at least 51 weight percent.

Especially preferred fiber compositions are as follows: 51 to 59.5 weight percent $SiO_2$, 1 to 4 weight percent $Al_2O_3$, 36 to 45 weight percent CaO+MgO, 0 to 4 weight percent $Na_2O$+$K_2O$, 0 to 4 weight percent total iron (present as $Fe^{2+}$ or $Fe^{3+}$) expressed as FeO, and 0 to 1.0 weight percent total sulfur expressed as $S^{2-}$. Preferably, the combined amount of silica and alumina is from 53 to 62 weight percent.

In a preferred embodiment of fiber compositions used in the invention, the ratio of the amount by weight of CaO to the amount by weight of MgO is from 1.5 to 6.

Exemplary fiber compositions that may be used in the invention include compositions A–D above. They also include commercial or known compositions E–I and composition J, which is a commercial rockwool used in high-temperature or fire-barrier applications, specified in the following chart:

| Ingredient | Amount (weight percent) | | | | | |
|---|---|---|---|---|---|---|
| | Comp. E | Comp. F | Comp. G | Comp. H | Comp I | Comp. J |
| $SiO_2$ | 41.0 | 38.3 | 42.1 | 41.9 | 44.8 | 45.4 |
| $Al_2O_3$ | 4.5 | 10.4 | 8.9 | 6.8 | 8.7 | 13.7 |
| MgO | 14.1 | 10.9 | 16.0 | 14.2 | 10.7 | 11.1 |
| CaO | 35.3 | 36.1 | 28.2 | 34.3 | 33.1 | 19.6 |
| $Na_2O$ | 0.17 | 0.3 | 0.9 | 0.7 | 0.1 | 2.2 |
| $K_2O$ | 0.82 | 0.6 | 0.9 | 0.9 | 0.6 | 0.5 |
| $Fe_2O_3$ | 1.6 | 0.5 | 0.8 | 0.3 | 0.1 | 6.0 |
| $TiO_2$ | — | 0.3 | 0.4 | 0.3 | 0.5 | 1.7 |
| MnO | — | 0.3 | 0.2 | 0.1 | 0.5 | 0.2 |
| $P_2O_5$ | — | — | — | 0.4 | — | 0.1 |
| S | — | 0.7 | 0.4 | 0.2 | 0.2 | — |

Preferred fiber compositions that may be used in the invention include compositions K and L specified in the following chart:

| Ingredient | Amount (weight percent) | |
|---|---|---|
| | Comp. K | Comp. L |
| $SiO_2$ | 51.35 | 51.0 |
| $Al_2O_3$ | 2.5 | 4.0 |
| MgO | 11.9 | 10.0 |
| CaO | 33.1 | 26.5 |
| $Na_2O$ | 0.5 | 1.0 |
| $K_2O$ | 0.2 | 0.5 |
| $Fe_2O_3$ | 0.3 | 6.67 |
| $TiO_2$ | 0.15 | 1.0 |

Composition K is an especially preferred fiber composition.

We have discovered that fibers produced from low iron-content compositions can be made to perform well in simulated fire tests through the use of other nucleating agents as well as the phosphorus coatings. For example, if the compositions are melted under highly reducing conditions, the high-temperature performance improves. Further, the addition of a small amount of sulfide (e.g., 0.4 weight percent added as FeS) further improves the high-temperature performance. When such fibers were coated with $(NH_4)_2HPO_4$, the high-temperature performance was significantly improved. Notably, the fibers containing FeS, when coated with 3.6 weight percent $(NH_4)_2HPO_4$, performed as well in a simulated fire test as the standard mineral-wool composition J containing 5.4% FeO. A linear shrinkage of 5% was measured for the coated wool+FeS when heated to 930° C., compared to 6% shrinkage for the standard composition.

Particularly preferred mineral-fiber compositions have a high $SiO_2$ content, low $Al_2O_3$ content, and low $Fe_2O_3$ content when compared to standard mineral-fiber compositions. Exemplary fiber compositions according to the invention are those consisting essentially of the following components in the specified amounts:

| Ingredient | Amount (weight percent) |
|---|---|
| $SiO_2$ | 47.0 to 59.5 |
| $Al_2O_3$ | 0 to 4.0 |
| CaO + MgO | 36.0 to 48.0 |
| $Na_2O$ + $K_2O$ | 0 to 5.0 |

-continued

| Ingredient | Amount (weight percent) |
| --- | --- |
| FeO | 0.1 to 4.0 (total iron, present as $Fe^{2+}$ or $Fe^{3+}$, expressed as FeO) |
| S | 0.05–1.0 (total sulfur expressed as $S^{2-}$) | wherein $SiO_2+Al_2O_3 \geq 51\%$, $KI \geq 40$, and the portion of the iron present as $Fe^{2+}$ is greater than 50% of total iron ($Fe^{2+}$ and $Fe^{3+}$). Regarding the $Fe^{2+}/Fe^{3+}$ ratio, $Fe^{2+}$ is preferably greater than 50%, and may be as high as 80%, or greater.

More preferred compositions meet the following specification:

| Ingredient | Amount (weight percent) |
| --- | --- |
| $SiO_2$ | 48.0 to 59.0 |
| $Al_2O_3$ | 0 to 3.0 |
| CaO + MgO | 37.0 to 47.0 |
| $Na_2O + K_2O$ | 0 to 4.0 |
| FeO | 0.1 to 3.0 (total iron, expressed as FeO) |
| S | 0.05–0.8 (total sulfur, expressed as $S^{2-}$) | wherein $SiO_2+Al_2O_3 \geq 51\%$, MgO ranges from 4 to 32%, CaO ranges from 15 to 43%, $KI \geq 40$, and greater than 50% of the total iron ($Fe^{2+}$ and $Fe^{3+}$) is present as $Fe^{2+}$.

Even more preferred ranges for the ingredients are:

| Ingredient | Amount (weight percent) |
| --- | --- |
| $SiO_2$ | 49.0 to 58.0 |
| $Al_2O_3$ | 0.2 to 3.0 |
| CaO + MgO | 40.0 to 46.0 |
| $Na_2O + K_2O$ | 0 to 3.0 |
| FeO | 0.1 to 3.0 (total iron, expressed as FeO) |
| S | 0.1 to 0.5 (total sulfur, expressed as $S^{2-}$) | wherein $SiO_2+Al_2O_3 \geq 52\%$, MgO ranges from 5 to 25%, CaO ranges from 15 to 41% $KI \geq 40$, and greater than 50% of the total iron is present as $Fe^{2+}$.

As noted above, the German index (KI) value should be greater than or equal to 40 to be considered free of suspicion. The index is calculated as follows: $KI=\sigma(Na_2O, K_2O, CaO, MgO, BaO, B_2O_3)-2Al_2O_3$. This places restrictions on alumina levels and levels of ingredients not specified in the index, such as silica.

Bulk nucleation and crystallization of mineral-wool fibers is desirable when the fibers are to be used for high-temperature applications. When fibers bulk nucleate and crystallize (as opposed to a random surface nucleation) they retain their fibrous nature after crystallization, and thereby minimize shrinkage and retain the desirable properties of fibers. Bulk nucleation and crystallization can be produced in the glasses of this invention by including sulfur in the composition and by melting the glass under reducing conditions. To determine the amount of sulfide necessary to produce bulk nucleations in the glasses, the procedures described at column 3 of U.S. Pat. No. 4,366,251 may be followed.

Basically, one way of producing fibers contemplates two steps. First, silica, dolomite, clay, limestone, or other suitable raw materials are melted in a crucible, pot, or continuous glass-melting unit, depending on the quantity of product wanted and the manner of fiber formation to be utilized. Second, when a suitably homogeneous melt is attained, amorphous fibers are produced from the melt in any conventional manner, such as by drawing, spinning, or blowing.

Regarding the equipment for the production of mineral wool, one may use any known melting furnace for the production of traditional mineral wool. Either a cupola furnace or an electric furnace may be employed in combination with any known spinning device.

The melts can be produced in a cupola furnace in which is loaded a mixture of the raw materials. Also added is the required quantity of coke for causing burning and melting. If the melts are produced in an electric or gas-fired furnace, a reducing agent such as powdered carbon is added to chemically reduce the melt. The melt can be fiberized in a traditional spinning aggregate comprising four spinner wheels connected in a cascade.

Coating the mineral fibers with a phosphorus coating is preferably carried out by depositing a coat containing one or more phosphorus compounds on the surface of the fibers. When the fibers are heated, their linear thermal contraction at 930° C. is preferably less than 20 percent. The amount of the phosphorus compound(s) coating the surface of fibers preferably falls in the range of from 0.5 to 10% by weight, calculated as $P_2O_5$. The thermal contraction at 930° C. is preferably less than 10% when the content of phosphorus compound is from 1 to 5% by weight as $P_2O_5$.

Preferably, we adhere the phosphorus compound to the surface of the mineral fibers by spraying or other means of depositing a solution on the fibers. An alternative method is soaking the fibers in a solution containing a phosphorus compound, for example, a solution of a phosphate such as $MH_2PO_4$, $M_2HPO_4$, $MHPO_4$, or $M_3PO_4$, where M represents an alkali metal, alkaline-earth metal, and/or ammonium.

The phosphorous compound(s) may be applied with or without a binder, such as a phenolic binder. The phosphorus-containing additive may be applied to the mineral-wool fibers either before the binder is applied, or at the same time the binder is applied. In a preferred embodiment, the phosphorus additive is dissolved in a suitable binder carrier, e.g., water, or is suspended in the binder carrier. One function of binder, but not a requirement, is to help adhere the phosphorous compound(s) to the mineral-wool fibers. Subsequent to the adhesion of the phosphorus compound(s) to the surface of fibers, the fibers are drained if necessary, then gradually dried in a stream of air or forcibly dried by heating at an elevated temperature. U.S. Pat. No. 4,194,914 more fully describes phosphorus-treating processes suitable for use with the invention.

In a full-scale process, the fibers may be blown into a forming chamber and collected on a moving conveyor or rotating wheel. Binder may be applied immediately after the fiber-attenuation zone, and before the fiber-collection zone.

In a preferred embodiment, the coating composition contains two main components: (1) an inorganic phosphate additive; and (2) a polymeric or oligomeric thermosetting binder. The additive combination imparts improved high-temperature performance to mineral-wool fibers. Examples of inorganic phosphates are aluminum phosphate, diammonium hydrogen phosphate, monoammonium dihydrogen phosphate, phosphoric acid, sodium pyrophosphate, and calcium phosphate (dibasic).

A combination of a phosphate, such as monoammonium dihydrogen phosphate (MAP), and colloidal silica can also be used as an additive mixture. For example, 70% MAP and 30% silica can be combined as the inorganic additive. A benefit of such an additive mixture is better retention of fiber strength after exposure to high-temperature conditions. It appears that certain phosphates that form a pyrophosphoric acid intermediate upon heating, such as MAP, may attack the silica in the fibers at their surfaces and, consequently, weaken them. If colloidal silica is present in the additive, the pyrophosphoric acid reacts with it to some extent and forms a high-temperature silicate-orthophosphate protective coating. This lessens attack and weakening of the fibers, while retaining improved high-temperature performance. Three exemplary additive combinations (i–iii) containing a phosphate and a colloidal silica are as follows:

|                     | Parts (by weight) |       |       |
|---------------------|-------------------|-------|-------|
| Additive ingredient | i                 | ii    | iii   |
| deionized water     | 185               | 178.3 | 182.5 |
| MAP                 | 5                 | 5     | 5     |
| Nyacol 9950         | 10                | —     | —     |
| Nyacol DP5110       | —                 | 16.67 | —     |
| Nyacol 2040NH$_4$   | —                 | —     | 12.5  |

The Nyacol additives are colloidal-silica products available from The PQ Corporation, with the Nyacol 9950 being provided as a 50% solution, Nyacol DP5110 being provided as a 30% solution, and Nyacol 2040NH$_4$ being provided as a 40% solution.

Also, two types of thermoset binders—phenolic resoles and polyacrylic acid based thermosets—work well in combination with the above additives. The ratio of thermoset binder to phosphate additive may vary from 90:10 to 40:60, respectively, with the preferred range being 75:25 to 50:50. Any suitable combination of thermoset binder and phosphate additive may be used.

Several polyacrylic acid based binders may be used in this invention in place of a phenolic resole. One example contains polyacrylic acid and a hydroxyl-functional crosslinking agent, e.g., "HF-5" resin available from Rohm & Haas.

The additive mixture should have an acidic pH, since too alkaline of a pH may cause the coated fiber to shrivel. The pH of the additive mixture may be appropriately adjusted, if necessary, using a suitable acidic agent, such as sulfuric acid.

The following examples illustrate preferred embodiments of the invention.

EXAMPLE 1

The following table contains an example of a mineral-wool composition according to the invention compared to a standard mineral-wool composition:

|                                              | Weight                    |                          |
|----------------------------------------------|---------------------------|--------------------------|
| Ingredient                                   | Standard Mineral Fiber    | Inventive Mineral Fiber  |
| SiO$_2$                                      | 45.4                      | 51.0                     |
| Al$_2$O$_3$                                  | 13.7                      | 2.5                      |
| Na$_2$O                                      | 2.2                       | 0.5                      |
| K$_2$O                                       | 0.5                       | 0.2                      |
| MgO                                          | 11.3                      | 11.8                     |
| CaO                                          | 19.6                      | 32.9                     |
| TiO$_2$                                      | 1.4                       | 0.2                      |
| FeO (total iron expressed as FeO)            | 5.4                       | 0.67                     |
| S (total sulfur expressed as S$^{2-}$)       |                           | 0.23                     |
| Fe Present:                                  |                           |                          |
| as FeO                                       |                           | 0.61                     |
| as Fe$_2$O$_3$                               |                           | 0.08                     |
| Temperature (° C.) for a viscosity of 10 poise | 1461                    | 1382                     |
| Liquidus temperature (° C.)                  | 1233                      | 1322                     |
| KI                                           | 6.2                       | 40.4                     |

In the above table, "FeO" is the total amount of iron expressed as FeO, while "Fe" breaks down the amount of iron in the composition into that present as Fe$^{2+}$ or FeO, and that present as Fe$^{3+}$ or Fe$_2$O$_3$.

The inventive fibers from the table above were immersed in an aqueous solution containing diammonium hydrogen phosphate at a concentration of 0.5%. The fibers were pulled out of the aqueous solution and, after the excess solution adhering to the surface of fibers was removed by simple drainage, the fibers were dried at a temperature falling in the range of from about 100° C. to 125° C. In the fibers, the phosphorus compound was found to be contained in a concentration of 1.96% by weight, computed as P$_2$O$_5$ The fibers were tested for thermal contraction. The results confirmed by the test that the fibers of the present invention showed only about 5.0% linear contraction when heated up to about 930° C.

EXAMPLE 2

Whereas the fibers in Example 1 contained a relatively high amount of sulfur and were melted under reducing conditions to produce mostly FeO in the composition, the fibers of this example contained a very low amount of sulfur and were melted in a platinum crucible under oxidizing conditions (in an air atmosphere). Thus, additional nucleation of the fibers occurred in Example 1, while no additional bulk nucleation would have occurred in the present example described below.

In the pilot process used in this example, a fibrous mineral wool was formed from a molten stream that was fiberized by an air jet and collected as an assembly downstream in a static metal cage. The metal cage was completely enclosed by a larger metal box, and process air was continuously removed at the far downstream end of this enclosure by a flexible duct connected to an electric exhaust blower, preceded by an air filter to remove suspended droplets of binder. Binder was sprayed onto the fibers as an aqueous solution or dispersion using a binder ring containing spray nozzles. Application of the binder occurred immediately after the fiberizing or attenuation zone, and before the fibers entered the metal-collection enclosure.

In particular, binder was applied in the form of an aqueous spray using nozzles attached to a circular binder ring. The binder ring, the number of nozzles, and the spray pattern of the nozzles were selected to give a theoretical coverage of at least 100% of the fiber veil. The veil measured approximately 8 inches in diameter. A 21-inch i.d. (inside diameter), air-atomized binder ring with 20 tip openings was found to be suitable, and only 10 of the 20 ring tips were used (every other one was plugged). An SU12 air-atomized pressure spray setup (2850 fluid cap+73160 air cap), available from Air Spray Systems, was chosen to provide a good spray pattern at a binder flow rate of up to 1 gallon per minute (gpm). The air-atomized setup was used to provide a smaller particle diameter for better fiber coverage and the flexibility to adjust the flow rate and maintain a good spray pattern at reduced flow rates. An air pressure of 20 psig gave good atomization. A 3-gpm Echo Gearchem pump (available from Pulsameter) connected to a Leeson Speedmaster DC controller with a ½-inch MINI-MAG flowmeter (available from Fischer & Porter) supplied and controlled binder flow to the ring. Initially, the flow rate was set at 1 gpm at a binder solids of 5.5%, but this gave a wet wool pack. Subsequently, the flow rate was reduced to 0.5 gpm at a binder solids of 5.5%. Mineral wool pull rate averaged approximately 1⅓ lb./min. Under these conditions, ignition loss (LOI, which is the reduction in weight of the fibers after heating by burning or pyrolyzing measured by heating dried fibers to a temperature of about 540° C.) ranged from 5 to 9%, depending upon the ratio of additive to organic binder. Generally, good high-temperature performance was obtained for the various inventive examples evaluated (2a–2k), with results for these examples along with those for comparative example II summarized below.

| Ex. | Fiber comp. | Binder | Phos. | Flow rate (gpm) | Total add. solids (%) | Inorg. solids (% total) | Avg. LOI (%) | Avg. $P_2O_5$ (%) |
|---|---|---|---|---|---|---|---|---|
| 2a | K | Phen. | DAP | 1.0 | 5.5 | 50 | 8.6 | |
| 2b | K | Phen. | DAP | 0.5 | 11.0 | 50 | 15.4 | 4.75 |
| 2c | K | Phen. | DAP | 0.5 | 7.7 | 50 | 7.3 | |
| 2d | K | Phen. | DAP | 0.5 | 5.5 | 50 | 8.7 | 2.20 |
| 2e | K | Phen. | DAP | 0.5 | 3.3 | 50 | 3.2 | 0.82 |
| 2f | K | Phen. | DAP | 0.5 | 5.5 | 25 | 5.5 | |
| 2g | K | Phen. | DAP | 0.5 | 5.5 | 25 | 6.8 | |
| 2h | K | Non. | MAP | 0.5 | 5.5 | 40 | 9.0 | |
| 2i | K | Non. | SPyP | 0.5 | 5.5 | 40 | 6.2 | |
| 2j | K | Non. | MAP/silica | 0.5 | 5.5 | 34/16 | 5.7 | |
| 2k | K | Non. | DAP | 0.5 | 5.5 | 40 | 5.0 | |
| II | K | Phen. | — | 0.5 | 3.8 | 0 | 9.0 | |

As indicated in the above table, composition K, which has been identified previously, was used for the fibers in all examples. A phenolic ("Phen.") or non-phenolic ("Non.") binder was also employed in the examples—specifically, sodium-catalyzed RE-176 (available from Owens Corning, Newark, Ohio) was used in the additives of examples 2a–2g and II, and HF-5 resin (available from Rohm & Haas) was used in examples 2h–2k. The phosphate ("Phos.") employed in the additive ("add.") for each of examples 2a–2i was DAP $((NH_4)_2HPO_4)$, MAP $(NH_4HPO_4)$, or SPyP $(Na_4P_2O_7 \cdot 10H_2O)$. Colloidal silica, specifically, DP5110 (available from The PQ Corporation), was also added in example 2j. In examples 2a–2g and II the pH of the additive was adjusted to be acidic (pH=5 to 6) using sulfuric acid. The total amount of additive present as solids, given in weight percent based on the weight of the fiber, is provided for each example along with the percentage of that total attributable to inorganic solids (the percentage of the total attributable to organic solids may be found by subtracting from 100 percent the percent inorganic solids). The linear shrinkages of the examples at various densities are given below.

| | Density | | | Linear shrinkage (%) (reported by density) | | |
|---|---|---|---|---|---|---|
| Ex. | Low | Medium | High | Low | Medium | High |
| 2a | 0.028 | 0.100 | 0.186 | 7.4 | 8.0 | 1.2 |
| 2b | 0.039 | 0.213 | 0.128 | 26.4 | 19.2 | 8.8 |
| 2c | 0.032 | 0.102 | 0.160 | 10.0 | 5.4 | 6.0 |
| 2d | 0.033 | 0.031 | 0.122 | 10.0 | 7.6 | 5.8 |

-continued

| | Density | | | Linear shrinkage (%) (reported by density) | | |
|---|---|---|---|---|---|---|
| Ex. | Low | Medium | High | Low | Medium | High |
| 2e | 0.034 | 0.056 | 0.059 | 50.1 | 33.7 | 6.7 |
| 2f | 0.020 | 0.059 | 0.111 | 40.6 | 46.6 | 31.1 |
| 2g | 0.029 | 0.061 | 0.070 | 49.6 | 53.2 | 53.7 |
| 2h | 0.028 | 0.066 | 0.080 | 9.1 | 3.3 | 3.8 |
| 2i | 0.032 | 0.071 | 0.092 | 34.1 | 5.1 | 3.4 |
| 2j | 0.047 | 0.060 | 0.093 | 14.3 | 8.6 | 5.7 |
| 2k | 0.034 | 0.059 | 0.082 | 33.8 | 18.8 | 15.9 |
| II | 0.060 | 0.058 | 0.164 | 52.1 | 50.9 | 29.4 |

Density was calculated from sample volume and weight, and measured to determine how closely the experimental samples matched the density of standard production samples. In general, the medium densities reflect values similar to standard mineral-wool products made on a full-scale basis. Fire tests were performed by heating according to the ASTM E119 curve to 927° C. As evident from the above results, the inventive examples had favorable high-temperature performance in comparison with example II. Additionally, examples similar to examples 2d and 2e except for the use of an alkaline additive (sodium hydroxide to give a pH of 9), which respectively had LOI values of 4.7% and 2.9%, shriveled when tested for linear shrinkage. While the invention has been described in reference to preferred features and embodiments, the artisan will recognize from the teachings and through routine practice of the invention that variations and modifications can be made without departing from the spirit of the invention. Thus, the invention is intended not to be limited by the foregoing detailed description, but to be defined by the following claims and their equivalents.

We claim:

1. A mineral-fiber product suitable for insulation comprising: a mineral fiber having a composition consisting essentially of:

| Ingredient | Weight Percent |
|---|---|
| $SiO_2$ | 57.0 to 59.5 |
| $Al_2O_3$ | 0 to 4.0 |
| CaO + MgO | 36.0 to 48.0 |
| $Na_2O + K_2O$ | 0 to 5.0 |
| FeO | 0.1 to 4.0 (total iron expressed as FeO) |
| S | 0.05–1.0 (total sulfur expressed as $S^{2-}$) | wherein the amount of $SiO_2+Al_2O_3 \geq 51$ weight percent, the sum of the weight percentages of any $Na_2O$, $K_2O$, CaO, MgO, BaO, $B_2O_3$ minus two times the weight percentage of $Al_2O_3$ is greater than 40 and the amount of the total iron present as $Fe^{2+}$ is greater than 50% of total iron; and a coating on the mineral fiber, the coating including a phosphorus compound in an amount ranging from 0.5 to 10.0 weight percent calculated as $P_2O_5$ based on the total weight of the fiber plus the coating.

2. A mineral-fiber product suitable for insulation comprising: a mineral fiber having a composition consisting essentially of:

| Ingredient | Weight Percent |
|---|---|
| $SiO_2$ | 48.0 to 59.0 |
| $Al_2O_3$ | 0 to 3.0 |

-continued

| Ingredient | Weight Percent |
| --- | --- |
| CaO + MgO | 37.0 to 47.0 |
| $Na_2O + K_2O$ | 0 to 4.0 |
| FeO | 0.1 to 3.0 (total iron expressed as FeO) |
| S | 0.05–0.8 (total sulfur expressed as $S^{2-}$) | wherein the amount of $SiO_2+Al_2O_3 \geq 51$ weight percent, the amount of MgO ranges from 4 to 32 weight percent, the amount of CaO ranges from 15 to 43 weight percent, the sum of the weight percentages of any $Na_2O$, $K_2O$, CaO, MgO, BaO, $B_2O_3$ minus two times the weight percentage of $Al_2O_3$ is greater than 40 and greater than 50% of the total iron is present as $Fe^{2+}$; and a coating on the mineral fiber, the coating including a phosphorus compound in an amount ranging from 0.5 to 10.0 weight percent calculated as $P_2O_5$ based on the total weight of the fiber plus the coating.

3. A mineral-fiber product according to claim 1 where the mineral fiber has the following composition:

| Ingredient | Weight Percent |
| --- | --- |
| $SiO_2$ | 49.0 to 58.0 |
| $Al_2O_3$ | 0.2 to 3.0 |
| CaO + MgO | 40.0 to 46.0 |
| $Na_2O + K_2O$ | 0 to 3.0 |
| FeO | 0.1 to 3.0 (total iron expressed as FeO) |
| S | 0.1 to 0.5 (total sulfur expressed as $S^{2-}$) | wherein $SiO_2+Al_2O_3 \geq 51$ weight percent, the amount of MgO ranges from 5 to 25 weight percent, the amount of CaO ranges from 15 to 41 weight percent, the sum of the weight percentages of any $Na_2O$, $K_2O$, CaO, MgO, BaO, $B_2O_3$ minus two times the weight percentage of $Al_2O_3$ is greater than 40 and greater than 50% of the iron is present as $Fe^{2+}$.

4. A mineral-fiber composition according to claim 1 wherein the mineral fiber has the following composition:

| Ingredient | Weight Percent |
| --- | --- |
| $SiO_2$ | 51.0 |
| $Al_2O_3$ | 2.5 |
| CaO | 32.9 |
| MgO | 11.8 |
| $Na_2O$ | 0.5 |
| $K_2O$ | 0.2 |
| $TiO_2$ | 0.2 |
| FeO | 0.7 |
| S | 0.2 (total sulfur expressed as $S^{2-}$) |

5. A mineral-fiber product according to claim 1 wherein the amount of the phosphorus compound in the coating ranges from 1.0 to 5.0 weight percent calculated as $P_2O_5$.

6. A mineral-fiber product comprising a wool containing a plurality of fibers according to claim 1.

7. A mineral-fiber product comprising:
at least one mineral fiber made from a fiber composition comprising $SiO_2$ in an amount of from 47.0 to 59.5 weight percent, $Al_2O_3$ in an amount of from 0 to 0.40 weight percent, CaO and MgO in a total amount of from 36.0 to 48.0 weight percent, $Na_2O$ and $K_2O$ in a total amount of from 0 to 5.0 weight percent, iron present as $Fe^{2+}$ or $Fe^{3+}$ in an amount of from 0.1 to 4.0 weight percent expressed as FeO, and sulfur in an amount of from 0.05 to 1.0 weight percent expressed as $S^{2-}$, wherein the sum of the weight percentages of $SiO_2$ and $Al_2O_3$ is greater than or equal to 51 and the amount of total iron present as $Fe^{2+}$ is greater than 50% of the total iron; and a coating on the fiber comprising a phosphorus compound in an amount providing a phosphorus content of from 0.5 to 10.0 weight percent calculated as $P_2O_5$.

8. A mineral-fiber product as defined in claim 7, wherein said coating further comprises a binder.

9. A mineral-fiber product as defined in claim 8, wherein said binder is a phenolic binder.

10. A mineral-fiber product as defined in claim 7, wherein said phosphorus compound is a phosphate of the formula $MH_2PO_4$, $M_2HPO_4$, $MHPO_4$, or $M_3PO_4$, where M is an alkali metal, alkaline earth metal, or ammonium.

11. A mineral-fiber product as defined in claim 7, wherein said phosphorus compound is $(NH_4)_2HPO_4$.

12. A mineral-fiber product as defined in claim 7, wherein said phosphorus content is from 1.0 to 5.0 weight percent.

13. A mineral-fiber product as defined in claim 7, wherein the sum of the weight percentages of any $Na_2O$, $K_2O$, CaO, MgO, BaO, and $B_2O_3$ minus two times the weight percentage of $Al_2O_3$ in the fiber composition is greater than or equal to 40.

14. A mineral-fiber as defined in claim 7 wherein the amount of $SiO_2$ is from 48.0 to 59.0 weight percent, the amount of $Al_2O_3$ is from 0 to 3.0 weight percent, the total amount of CaO and MgO is from 37.0 to 47.0 weight percent with the amount of MgO being from 4 to 32 weight percent and the amount of CaO being from 15 to 43 weight percent, the total amount of $Na_2O$ and $K_2O$ is from 0 to 4.0 weight percent, the amount of iron is from 0.1 to 3.0 weight percent expressed as FeO, the amount of sulfur is from 0.05 to 0.8 weight percent expressed as $S^{2-}$, and the sum of the weight percentages of any $Na_2O$, $K_2O$, CaO, MgO, BaO, and $B_2O_3$ minus two times the weight percentage of $Al_2O_3$ is greater than or equal to 40.

15. A mineral-fiber product according to claim 7 wherein the amount of $SiO_2$ is from 49.0 to 58.0 weight percent, the amount of $Al_2O_3$ is from 0.2 to 3.0 weight percent, the total amount of CaO and MgO is from 40.0 to 46.0 weight percent with the amount of MgO being from 5 to 25 weight percent and the amount of CaO being from 15 to 41 weight percent, the total amount of $Na_2O$ and $K_2O$ is from 0 to 3.0 weight percent, and the amount of sulfur is from 0.05 to 0.8 weight percent expressed as $S^{2-}$.

16. A mineral-fiber product according to claim 7, wherein the fiber has a linear thermal contraction at 930° C. of less than 20 percent.

17. A mineral-fiber product comprising:
at least one mineral fiber made from a fiber composition comprising $SiO_2$ in an amount of 51.0 weight percent, $Al_2O_3$ in an amount of 2.5 weight percent, CaO in an amount of 32.9 weight percent, MgO in an amount of 11.8 weight percent, $Na_2O$ in an amount of 0.5 weight percent, $K_2O$ in an amount of 0.2 weight percent, $TiO_2$ in an amount of 0.2 weight percent, iron present as $Fe^{2+}$ or $Fe^{3+}$ in an amount of 0.7 weight percent expressed as FeO with greater than half of the amount of iron being present as $Fe^{2+}$, and sulfur in an amount of 0.2 weight percent expressed as $S^{2-}$, wherein the sum of the weight percentages of any $Na_2O$, $K_2O$, CaO, MgO, BaO, and $B_2O_3$ minus two times the weight percentage of $Al_2O_3$ is greater than or equal to 40; and a coating on the fiber comprising a phosphorus compound in an amount providing a phosphorus content of from 0.5 to 10.0 weight percent calculated as $P_2O_5$.

18. A mineral-fiber product as defined in claim 17, wherein said coating further comprises a binder.

19. A mineral-fiber product as defined in claim 18, wherein said binder is a phenolic binder.

20. A mineral-fiber product as defined in claim 17, wherein said phosphorus compound is a phosphate of the formula $MH_2PO_4$, $M_2HPO_4$, $MHPO_4$, or $M_3PO_4$, where M is an alkali metal, alkaline earth metal, or ammonium.

21. A mineral-fiber product as defined in claim 17, wherein said phosphorus compound is $(NH_4)_2HPO_4$.

22. A mineral-fiber product as defined in claim 17, wherein said phosphorus content is from 1.0 to 5.0 weight percent.

23. A mineral-fiber product comprising:
   a mineral fiber having a composition comprising 37 to 64 weight percent $SiO_2$, 0 to 12 weight percent $Al_2O_3$, 30 to 51 weight percent CaO+MgO, and 0 to 6 weight percent $Na_2O+K_2O$; and
   a coating on the fiber comprising a phosphorus-containing additive in an amount providing a phosphorus content of from 0.5 to 10.0 weight percent calculated as $P_2O_5$ based on the total weight of the fiber plus coating.

24. A mineral-fiber product according to claim 23, wherein the composition of the mineral fiber further comprises 0 to 7.0 weight percent total iron (present as $Fe^{2+}$ or $Fe^{3+}$) expressed as FeO, and 0 to 1.5 weight percent total sulfur expressed as $S^{2-}$.

25. A mineral-fiber product according to claim 23, wherein the phosphorus-containing additive is selected from the group consisting of: aluminum phosphate; diammonium hydrogen phosphate; monoammonium dihydrogen phosphate; phosphoric acid; sodium pyrophosphate; and calcium phosphate, dibasic.

26. A mineral-fiber product according to claim 24, wherein the coating further comprises a thermosetting binder.

27. A mineral-fiber product according to claim 25, wherein the thermosetting binder is a polyacrylic acid based binder.

28. A mineral-fiber product according to claim 24, wherein the coating further comprises colloidal silica.

29. A mineral-fiber product according to claim 24, which is a high-temperature resistant wool comprising a plurality of the coated mineral fibers.

* * * * *

UNITED STATES PATENT AND TRADEMARK OFFICE
CERTIFICATE OF CORRECTION

PATENT NO. : 5,968,648
DATED : October 19,1999
INVENTOR(S) : Rapp, et al.

It is certified that error appears in the above-identified patent and that said Letters Patent is hereby corrected as shown below:

Claim 1, Line 5 should read:

| Ingredient | Weight Percent |
|---|---|
| $SiO_2$ | 47.0 to 59.5 |

Signed and Sealed this

First Day of August, 2000

Attest:

Q. TODD DICKINSON

*Attesting Officer*          *Director of Patents and Trademarks*